May 14, 1968  R. M. RUSSELL  3,383,508
INFRARED RADIOMETER ARRAY COMPRISING A PAIR
OF MULTI-ELEMENT SUBARRAYS
Filed Feb. 23, 1965  2 Sheets-Sheet 1

INVENTOR.
RAYMOND M. RUSSELL
BY
ATTORNEY

May 14, 1968 R. M. RUSSELL 3,383,508
INFRARED RADIOMETER ARRAY COMPRISING A PAIR
OF MULTI-ELEMENT SUBARRAYS
Filed Feb. 23, 1965 2 Sheets-Sheet 2
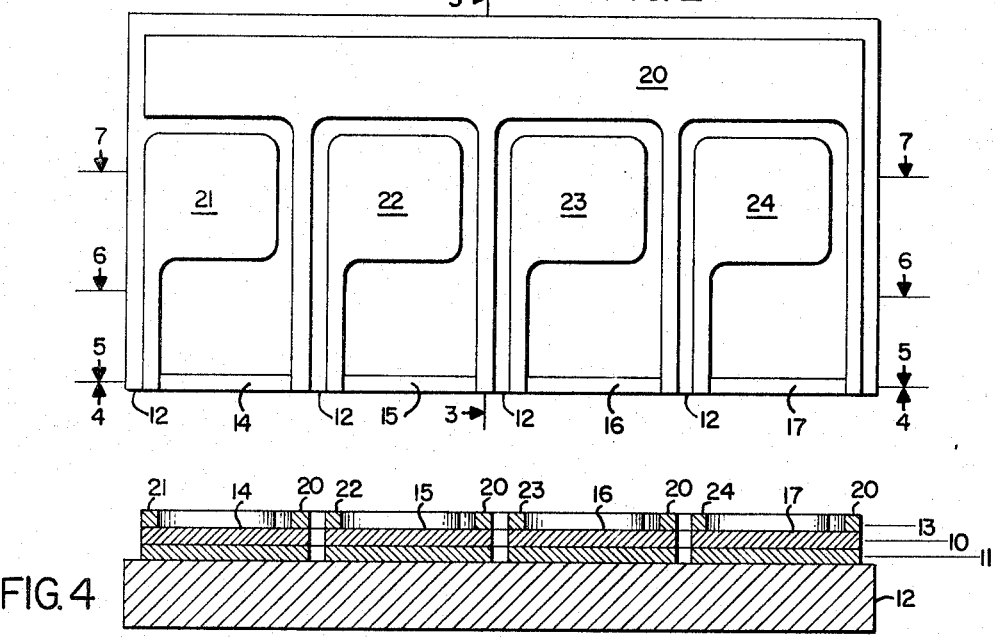
INVENTOR.
RAYMOND M. RUSSELL
BY
ATTORNEY United States Patent Office 3,383,508
Patented May 14, 1968

3,383,508
INFRARED RADIOMETER ARRAY COMPRISING A PAIR OF MULTI-ELEMENT SUBARRAYS
Raymond M. Russell, Newton, Mass., assignor to Honeywell Inc., Minneapolis, Minn., a corporation of Delaware
Filed Feb. 23, 1965, Ser. No. 434,322
6 Claims. (Cl. 250—83)

ABSTRACT OF THE DISCLOSURE

An improved radiometric array made up of a pair of cooperative, multi-element subarrays, and an improved method for making the subarrays and preparing them for assembly.

---

This invention relates to the field of control devices, and more particularly to infrared radiometers. For a special application it was desired to have such an instrument which functioned as nearly as possible like a single straight row of very narrow detectors, all giving electrically independent signals, but with substantially no spacing between them longitudinally. This was in practice impossible to accomplish because of the need for making electrical connection to each end of each detector and yet for insulating the detectors from one another. It was approximated by arranging the detectors in two parallel rows, with minimum lateral displacement between the rows, successive individual detectors lying on opposite sides of a median straight line. It was further found possible to manufacture subarrays of four detectors each from a single piece of detector material, and arrange the subarrays side by side to give the desired detector pattern: the method for accomplishing this and the resulting device comprise the invention here.

The principal object of the invention is accordingly to provide a new and improved infrared radiometer. Subordinate objects are to provide a new and improved detector array, to provide such an array made up of several individual detectors combined physically into two unitary subarrays, to devise a method for producing an array of electrically independent, substantially linearly arranged detectors, and to provide detector subarrays which may be combined to give a desired overall array by simply abutting two subarrays in proper alignment.

Various other objects, advantages, and features of novelty not individually enumerated above which characterize my invention are pointed out with particularity in the claims annexed hereto and forming a part hereof. However, for a better understanding of the invention, its advantages and objects attained by its use, reference should be had to the subjoined drawing, which forms a further part hereof, and to the accompanying descriptive matter, in which I have illustrated and described a preferred embodiment of my invention.

Figure 1:
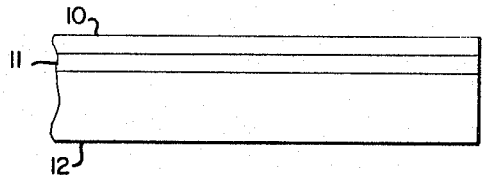
Figure 8:
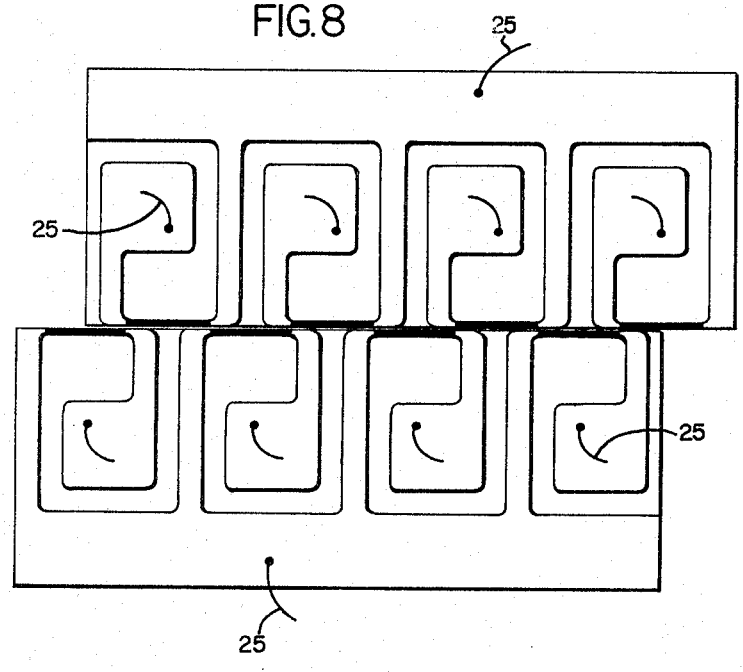

In the drawing, FIGURE 1 is a fragmentary edge view of a subarray in an early stage of manufacture; FIGURE 2 is a plan view of a subarray after further manufacturing steps have been performed; FIGURES 3–7 are sectional views taken along the lines 3—3, 4—4, 5—5, 6—6 and 7—7 of FIGURE 2; and, FIGURE 8 shows a completed detector made up of a pair of identical subarrays, after production has been completed.

Referring now to FIGURE 1, reference numeral 10 identifies a transverse slice from a crystal of indium antimonide, or a portion of such a slice. From this slice one or more subarrays, each comprising four physically unitary individual detectors having a common terminal and four individual terminals, are to be formed. The bottom portion of the slice as seen in FIGURE 1 is ground flat, and is secured by a suitable adhesive 11, such as an epoxy resin, to the flat upper surface of a wafer 12 of germanium of uniform thickness, which acts as a substrate. There may be substituted for germanium any other material having thermal expansion characteristics matching those of indium antimonide. Likewise, any other suitable electrically insulating adhesive, not subject to later outgassing, may be used instead of the epoxy resin. The upper surface of the indium antimonide may now be ground until the desired thickness of this material has been achieved.

The steps in producing a detector subarray according to the invention may be given as follows:

(1) Cut a thin transverse slice from a crystal of indium antimonide, large enough in cross section to contain one or several subarrays;
(2) Grind one surface of this slice flat;
(3) Secure the ground surface of the slice to a wafer of substrate material;
(4) Grind the other surface of the slice until the desired thickness is obtained;
(5) Apply a photoresist to the exposed antimonide surface;
(6) Apply a mask to the resist to define areas to be removed;
(7) Expose and develop to remove unexposed resist;
(8) Remove, by a suitable process such as abrasive cutting, the indium antimonide not protected by the developed photoresist;
(9) Remove the developed photoresist;
(10) Cut away the excess antimonide outside the subarray;
(11) Bevel one edge of the subarray; and
(12) Differentially etch that edge of the subarray to remove the antimonide, but not the germanium.

The steps in providing a detector made up of subarrays as just outlined may be given as follows, continuing the foregoing series of step members:

(13) Mount two subarrays with their bevelled edges in contact and their detector elements in desired transverse alignment;
(14) Apply a second mask to the exposed surfaces to protect the exposed germanium and desired portions of the antimonide;
(15) Deposit an ohmic conductor on the array where not masked to give a single common terminal pattern and four individual terminal patterns for each subarray;
(16) Remove the second mask;
(17) Apply conducting leads to the terminal areas; and,
(18) Passivate the entire working surface of the detector.

Reference should now be had to FIGURE 2, which shows one subassembly after completion of step 15 above, and to sectional FIGURES 3–7. In the drawing, the slice of indium antimonide is shown for clarity as only slightly larger than the finished subarray, but in practice it is possible to produce a plurality of such subarrays at the same time from a single slice, as will be readily realized. From the figures it will be seen that the antimonide has been cut away in a particular pattern, and thereafter covered with an ohmic material 13 such as gold, deposited in a plurality of further particular patterns to leave uncovered a plurality of narrow straight detector elements 14, 15, 16 and 17, all of which are connected at their right hand ends (FIGURE 2) to a common terminal pattern 20, and which are individually connected at their left hand ends to terminal patterns 21, 22, 23 and 24, respectively. It will be understood that the scale in these figures is somewhat distorted for clarity of illustration.

Figure 3:
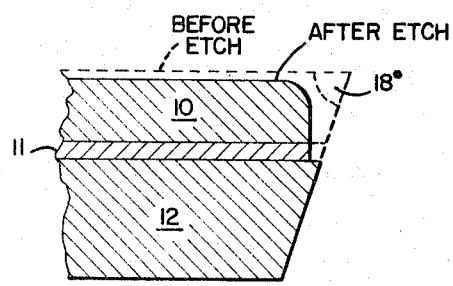

After sawing the individual subarrays out of the original mounted slice, each subarray is set up in a suitable jig and a bevel is ground along the edge bearing the detectors, as is shown in FIGURE 3. The bevelled edge is next treated with a differential etchant which acts on the indium antimonide and the epoxy resin without significantly affecting the germanium, as also shown in FIGURE 3. It will now be evident that if two subarrays are positioned with their bevelled and etched edges abutting, the physical contact is between the substrates, and a slight insulating space remains between the antimonide edges. The differential etch need be carried no further. Treatment for about 5 seconds to about 30 seconds with a standard etching fluid made up of about 5 parts nitric acid, 3 parts hydrofluoric acid and 3 parts acetic acid is sufficient to accomplish this.

Now two subarrays are mounted on a suitable mounting plate, in the position shown in FIGURE 8, but in physical abutment, with the long narrow detector elements staggered along the line of abutment. After this has been accomplished, a second mask is applied to protect the bare germanium and the long narrow detector elements, and a thin layer of gold is suitably applied, as by vapor deposition, to the remaining surfaces of the antimonide to make them ohmically conductive. When the second mask is removed, the detector elements and terminal patterns defined in FIGURES 2–7 will have been produced. Fine precious metal lead wires 25 are now connected to the terminal patterns by thermal compression bonding or other suitable measures, after which the entire array is passivated to reduce energy loss by reflection and to protect the sensitive surfaces.

The detector array is now ready for assembly into a dewer, or for use in any other appropriate fashion.

Numerous objects and advantages of my invention have been set forth in the foregoing description, together with details of the structure and function of the invention, and the novel features thereof are pointed out in the appended claims. The disclosure, however, is illustrative only and I may make changes in detail, especially in matters of shape, size and arrangement of parts, within the principle of the invention, to the full extent protected by the broad general meaning of the terms in which the appended claims are expressed.

I claim as my invention:

1. A radiometer comprising, in combination: a pair of detector subarrays, each including a row of narrow photoconductive elements extending along an edge thereof having first, common terminals and second, independent terminals, the lengths of the elements being substantially equal to the spacing therebetween; and means mounting said subarrays so that said rows are closely adjacent but not in electrical contact, and so that elements in each subarray are aligned with spaces between elements in the other subarray, whereby a narrow beam of radiation moving across said rows must always impinge on at least one of said elements.

2. In a transducer, in combination: a substrate; a first pattern of detector material bonded to said substrate to define a plurality of restricted areas having a common enlarged terminal portion and a like plurality of enlarged independent terminal portions; a second pattern of ohmically conductive material overlying said terminal portions of said first pattern to define a plurality of detectors having a mutual orientation determined by said patterns; and, means severally making electrical connections to said terminal portions of said second pattern.

3. In a transducer, in combination: a substrate; a first pattern of detector material bonded to said substrate to define a plurality of restricted areas having a common enlarged terminal portion and a like plurality of enlarged independent terminal portions; a second pattern of ohmically conductive material overlying said terminal portions of said first pattern to define a plurality of detectors having a mutual orientation determined by said patterns; means severally making electrical connections to said terminal portions of said second pattern; and anti-reflective means overlying said patterns and protecting them against environmental damage.

4. The method of producing a infrared detection component which comprises the steps of: adhesively bonding a thin slice of photoconductive material to a substrate having substantially the same thermal characteristics to comprise a subassembly, defining on said slice a pattern having at least one narrow marginal area merging at each end with larger terminal areas; removing from said slice the material not included in said pattern; bevelling the margin of said subassembly so that an acute angle is produced adjacent said narrow marginal areas; differentially operating upon said margins to remove material from said slice but not from said substrate; and connecting electrical conductors to said terminal areas.

5. The method of producing a infrared detection component which comprises the steps of: adhesively bonding a thin slice of photoconductive material to a substrate having substantially the same thermal characteristics to comprise a subassembly, defining on said slice a pattern having a plurality of spaced narrow marginal areas merging at each end with larger terminal areas; removing from said slice the material not included in said pattern; bevelling the margin of said subassembly so that an acute angle is produced adjacent said narrow marginal areas; differentially acting upon said margin to remove material from said slice but not from said substrate; depositing on said larger areas adherent layers of ohmically conductive material to define terminal areas; and connecting electrical conductors to said terminal areas.

6. The method of producing a infrared detection component which comprises the steps of: adhesively bonding a thin layer of photoconductive material to a substrate having substantially the same thermal characteristics, to comprise a subassembly, defining on said layer a pattern having at least one spaced narrow marginal area merging at each end with larger areas; removing from said layer the material not included in said pattern; bevelling the margin of said subassembly so that an acute angle is produced adjacent said narrow marginal areas; depositing on said larger areas adherent layers of ohmically conductive material to define terminal areas; connecting electrical conductors to said terminal areas; and coating the resulting component with an infrared transparent, anti-reflective material which protects it against environmental damage.

References Cited

UNITED STATES PATENTS

| | | | |
|---|---|---|---|
| 3,164,721 | 1/1965 | Astheimer | 250—83.3 |
| 3,236,707 | 2/1966 | Lins | 156—3 |
| 3,240,105 | 3/1966 | Woodcock et al. | 250—83 X |
| 3,267,727 | 8/1966 | Benzinger | 250—83.3 X |

ARCHIE R. BORCHELT, *Primary Examiner.*

UNITED STATES PATENT OFFICE
CERTIFICATE OF CORRECTION

Patent No. 3,383,508

May 14, 1968

Raymond M. Russell

It is certified that error appears in the above identified patent and that said Letters Patent are hereby corrected as shown below:

Column 4, lines 43, 45 and 47, "layer", each occurrence, should read -- slice --; line 44, after "characteristic" cancel the comma; line 47, after "larger" insert -- terminal --; lines 50 to 52, cancel "depositing on said larger areas adherent layers of ohmically conductive material to define terminal areas" and insert -- differentially operating upon said margins to remove material from said slice but not from said substrate --.

Signed and sealed this 3rd day of February 1970.

(SEAL)
Attest:

Edward M. Fletcher, Jr.
Attesting Officer

WILLIAM E. SCHUYLER, JR.
Commissioner of Patents